United States Patent
Labrou et al.

(10) Patent No.: US 8,150,829 B2
(45) Date of Patent: Apr. 3, 2012

(54) FACILITATING DISPLAY OF AN INTERACTIVE AND DYNAMIC CLOUD OF TERMS RELATED TO ONE OR MORE INPUT TERMS

(75) Inventors: Yannis Labrou, Washington, DC (US); Stergios Stergiou, Sunnyvale, CA (US); David L. Marvit, San Francisco, CA (US); Albert Reinhardt, Albany, CA (US)

(73) Assignee: Fujitsu Limited, Kawasaki (JP)

( * ) Notice: Subject to any disclaimer, the term of this patent is extended or adjusted under 35 U.S.C. 154(b) by 353 days.

(21) Appl. No.: 12/419,344

(22) Filed: Apr. 7, 2009

(65) Prior Publication Data

US 2009/0259636 A1 Oct. 15, 2009

Related U.S. Application Data

(60) Provisional application No. 61/124,018, filed on Apr. 11, 2008.

(51) Int. Cl.
*G06F 7/00* (2006.01)
*G06F 17/30* (2006.01)

(52) U.S. Cl. ........ 707/706; 707/707; 707/723; 707/750; 715/205; 715/769; 715/810

(58) Field of Classification Search .................. 707/706, 707/707, 723, 750, 767, 769; 715/205, 769, 715/810, 821; 705/14
See application file for complete search history.

(56) References Cited

U.S. PATENT DOCUMENTS

| | | | |
|---|---|---|---|
| 7,076,443 | B1 | 7/2006 | Emens et al. |
| 7,454,409 | B2 | 11/2008 | Roy et al. |
| 7,490,091 | B2 | 2/2009 | Lunenfeld |
| 7,533,084 | B2 | 5/2009 | Holloway et al. |
| 7,552,113 | B2 | 6/2009 | Roe et al. |
| 2003/0189594 | A1* | 10/2003 | Jones ........................... 345/764 |
| 2004/0181759 | A1* | 9/2004 | Murakami et al. ............. 715/532 |
| 2007/0028189 | A1* | 2/2007 | Robbins ........................ 715/853 |
| 2007/0078832 | A1* | 4/2007 | Ott et al. ........................... 707/3 |
| 2007/0130207 | A1* | 6/2007 | Pate et al. .................. 707/104.1 |

(Continued)

FOREIGN PATENT DOCUMENTS

CN 200510007838.4 1/2005

(Continued)

OTHER PUBLICATIONS

Catherine Meadows—"Analysis of the Internet Key Exchange Protocol Using the NRL Protocol Analyzer"—Security and Privacy, 1999, Procfeddings of the 1999 IEEE Symposium—May 9-12, 1999 (pp. 216-231).*

(Continued)

*Primary Examiner* — Jean B Fleurantin
*Assistant Examiner* — Anh Ly
(74) *Attorney, Agent, or Firm* — Baker Botts L.L.P.

(57) ABSTRACT

According to certain embodiments, facilitating display of terms includes facilitating display of a graphical user interface. One or more first input terms entered into a user entry window of the graphical user interface are received. One or more first output terms related to the first input terms are determined. Display of a first graphical cloud comprising the first output terms is facilitated. The first input terms are modified to yield one or more second input terms. One or more second output terms related to the second input terms are determined. Display of a second graphical cloud comprising the second output terms is facilitated.

34 Claims, 4 Drawing Sheets

U.S. PATENT DOCUMENTS

| | | | |
|---|---|---|---|
| 2007/0282785 A1* | 12/2007 | Fayyad et al. | 707/1 |
| 2007/0282826 A1 | 12/2007 | Hoeber et al. | 707/5 |
| 2008/0059897 A1* | 3/2008 | Dilorenzo | 715/764 |
| 2008/0071929 A1* | 3/2008 | Motte et al. | 709/246 |
| 2008/0134018 A1* | 6/2008 | Kembel et al. | 715/234 |
| 2009/0094262 A1* | 4/2009 | Marvit et al. | 707/100 |
| 2009/0204609 A1* | 8/2009 | Labrou et al. | 707/5 |

FOREIGN PATENT DOCUMENTS

WO      WO 2008/035044 A2      3/2008

OTHER PUBLICATIONS

Alexander Aiken and T. K. Lakshman—"Directional Type Checking of Logic Programs"—SSpringerLink—Static Analysis in Computer Science, 1994, vol. 864/1994, (pp. 43-60).*

Schatz, Bruce R., et al., "*Interactive Term Suggestion for Users of Digital Libraries: Using Subject Thesauri and Co-occurrence Lists for Information Retrieval*", ACM, XP-002349339, pp. 126-133, 1996.

Cooper, James W., et al., "*Lexical Navigation: Visually Prompted Query Expansion and Refinement*", ACM, XP-002324531, pp. 237-246, 1997.

Schatz, Bruce, et al., "*Federated Search of Scientific Literature*", Computer, XP-000824120, ISSN: 0018-9162, pp. 51-59, Feb. 1999.

European Patent Office, Communication, European Search Report Application No. 09 17 6240.1-2201, Ref. P113504EP00/JXH, 6 pages, Mar. 8, 2010.

White, Ryen W., et al., "Examining the effectiveness of real-time query expansion", ScienceDirect, Information Processing and Management, vol. 43, XP5863824, pp. 685-704, Jan. 27, 2007.

European Patent Office Communication, European Search Report and Annex to the European Search Report; Application No. 09157692.6-1225; Ref. P111738EP00/CLF; 9 pages, Jul. 7, 2009.

U.S. Appl. No. 12/613,731 entitled, "*Facilitating Display of an Interactive and Dynamic Cloud with Advertising and Domain Features*", 33 pages specification, claims and abstract, 6 pages of drawings, inventors Stergiou et al, Nov. 6, 2009.

European Office Action; Application No. 09 176 240.1-2201; pp. 5, May 30, 2011.

The State Intellectual Property Office of China, First Notification of Office Action, Patent Application No. 200910129960.7, Chinese Office Action and English translation, 15 pages, Apr. 27, 2011.

* cited by examiner

FACILITATING DISPLAY OF AN INTERACTIVE AND DYNAMIC CLOUD OF TERMS RELATED TO ONE OR MORE INPUT TERMS

RELATED APPLICATION

This application claims benefit under 35 U.S.C. §119(e) of U.S. Provisional Application Ser. No. 61/124,018, entitled "An Interactive and Dynamic Cloud of Terms Related to an Input of One or More Terms," filed Apr. 11, 2008, by Yannis Labrou et al., which is incorporated herein by reference.

TECHNICAL FIELD

This invention relates generally to the field of lexicographical analysis and more specifically to facilitating display of an interactive and dynamic cloud of terms related to one or more input terms.

BACKGROUND

Graphical user interfaces (GUIs) may be used to display results of a search. A user may enter a search query into a GUI, and the GUI may display search results for the query. In certain situations, GUIs might not provide adequate guidance for constructing searches.

SUMMARY OF THE DISCLOSURE

In accordance with the present invention, disadvantages and problems associated with previous techniques for facilitating display of output terms related to input terms may be reduced or eliminated.

According to certain embodiments, facilitating display of terms includes facilitating display of a graphical user interface. One or more first input terms entered into a user entry window of the graphical user interface are received. One or more first output terms related to the first input terms are determined. Display of a first graphical cloud comprising the first output terms is facilitated. The first input terms are modified to yield one or more second input terms. One or more second output terms related to the second input terms are determined. Display of a second graphical cloud comprising the second output terms is facilitated.

Certain embodiments of the invention may provide one or more technical advantages. A technical advantage of one embodiment may be that a cloud may display one or more output terms related to one or more input terms. The output terms may have graphical features (such as font size) that indicate the degree of relatedness between the output terms and the input terms. Another technical advantage of one embodiment may be that a user action may update the terms of the cloud. For example, a user may select a term in order to add the term to the input terms resulting in an updated set of output terms displayed in the cloud.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4D of the drawings, like numerals being used for like and corresponding parts of the various drawings.

Figure 1:
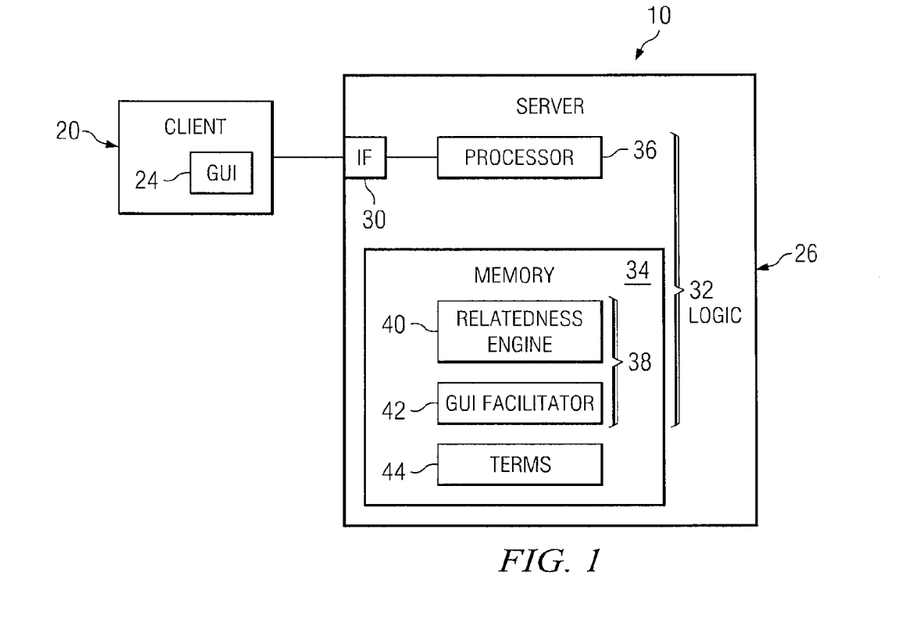
FIG. 1 illustrates an embodiment of a system that may be used to facilitate display of an interactive and dynamic cloud of terms related to one or more input terms.

FIG. 1 illustrates an embodiment of a system 10 that may be used to facilitate display of an interactive and dynamic cloud of terms related to one or more input terms. The output terms may have graphical features (such as font size) that indicate the degree of relatedness between the output terms and the input terms.

In the illustrated embodiment, system 10 includes a client 20 configured to display a graphical user interface (GUI) 24 and a server 26. Server 26 includes an interface (IF) 30, logic 32, and a memory 34. Logic 32 includes a processor 36 and applications 38 such as a relatedness engine 40 and a GUI facilitator 42. Memory 34 stores terms 44 and applications 38.

Client 20 may be any suitable device configured to display GUI 24. Client 20 may include a computer with a display, a television, a mobile device (such as a personal data assistant or a cell phone), computerized goggles, or other suitable device.

Figure 2:
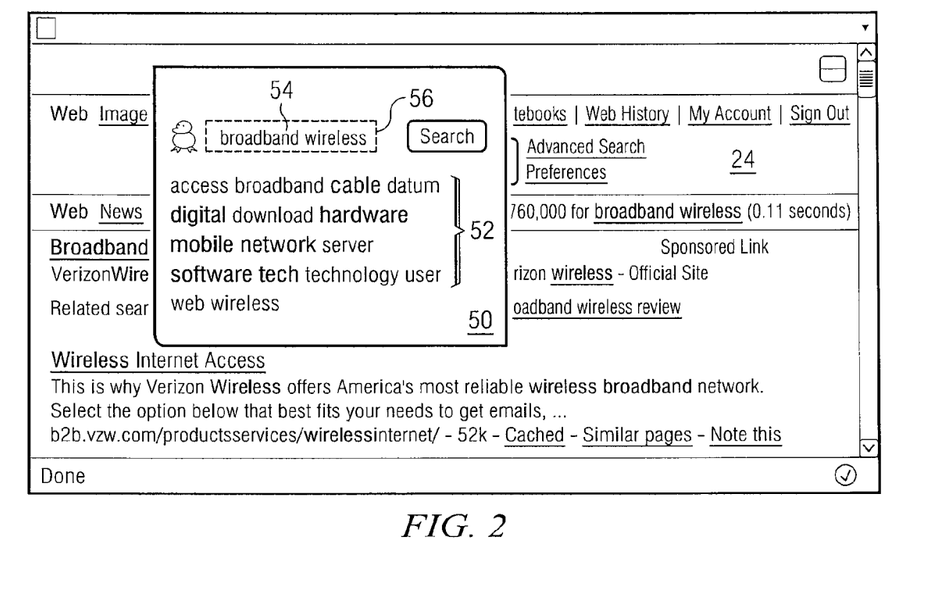
FIG. 2 illustrates an example of a graphical user interface (GUI) that may be used with the system of FIG. 1.

FIG. 2 illustrates an example of a GUI 24 that includes a user entry field 56. GUI 24 has a cloud 50 that includes terms 44, such as one or more output terms 52 related to one or more input terms 54 entered into user entry field 56. Terms 44 of cloud 50 may also include at least a subset of input terms 54.

The terms of cloud 50 may be arranged in any suitable order, such as in alphabetical order or in order of relatedness. The terms may have any suitable graphical features, such as any suitable font, font size, font color, underlining, bolding, or italicizing. Graphical features of a term may also include a sound that accompanies moving a cursor over the term or selecting the term.

In particular embodiments, a graphical feature of a term indicates the degree of relatedness of that term to input terms 54. For example, a larger font size may indicate a higher degree of relatedness. The font size may be determined from relatedness in any suitable manner. As an example, the font size may be calculated by normalizing values associated with the relatedness rankings of the terms, and converting the values to a font size. As another example, the font size may be calculated by ranking the terms by relatedness and assigning a predetermined number of terms to each font size.

In particular embodiments, cloud 50 may include one or more graphical elements that a user may utilize to produce a user action that modifies the input terms and results in updated output terms displayed in cloud 50. Examples of graphical elements include a link, a slide bar, or a radio button that a user may select, slide, or click, respectively. In particular embodiments, cloud 50 may provide a handle so output terms 52 may pass programmatically to a module, a webpage, a form, an application programming interface (API), or an application. In particular embodiments, cloud 50 may be implemented as JavaScript embedded in a website, such as a company website, or as an add-on to a web browser. A JavaScript code or the web browser add-on may include a call to relatedness engine 40 via interface 30 for identifying related terms.

Cloud 50 may be used in any suitable process, such as a search process, a tagging process, or a recommendation process. In a search process, output terms 52 of cloud 50 may be used as the input to a search engine query or another system or application offering a query interface.

In a tagging process, one or more output terms 52 may be used to annotate content (documents, parts of documents, images, videos, audio, news articles, etc.) with tags. Attempting to tag content may activate cloud 50. Terms may be selected from cloud 50 to tag the content.

In a recommendation process, one or more output terms 52 may be used as input for the invocation of an application. For example, if cloud 50 displays websites (or links to websites), the user may select a website to open the website. If cloud 50 displays songs (or links to song files), the user may select a song to play the song. GUI 24 is described in more detail with reference to server 26.

Referring back to FIG. 1, a term 44 may be a word or a phrase that denotes itself or an object by reference. For example, a term 44 may denote itself as "tree" may denote the concept of a tree in multiple senses. Examples of terms 44 that denote objects by reference include a webpage (the object) denoted by its title (the term), a summary of its contents (the term) or a phrase that describes its content (the term); a recipe (the object) denoted by its title (the term); a user (the object) denoted by a username (the term); a song or other multimedia object (the object) denoted by its title (the term); an artist (the object) denoted by the artist's name (the term); a document (the object) denoted by its title or authors (the term); and a movie (the object) denoted by its title (the term).

In the illustrated embodiment, system 10 includes interface 30, logic 32, and memory 34. Interface 30 receives input, sends output, processes the input and/or output, and/or performs other suitable operation. Interface 30 may comprise hardware and/or software.

Logic 32 performs the operations of the component, for example, executes instructions to generate output from input. In particular embodiments, logic 32 facilitates display of GUI 24 and receives input terms 54 entered into user entry window 56 of GUI 24 to initiate a search. Logic 32 determines output terms 52 related to input terms 54 and facilitates display of a graphical cloud 50 of GUI 24, where cloud 50 comprises output terms 52.

In the illustrated embodiment, logic 32 includes a processor 36 and applications 38 such as GUI facilitator 42 and relatedness engine 40. GUI facilitator 42 facilitates display of GUI 24. In particular embodiments, GUI facilitator 42 may send instructions on whether a specific website should display cloud 50 and/or instructions about the general look and feel of cloud 50.

Cloud 50 may pop up (or appear) or pop down (or disappear) in any suitable manner. In particular embodiments, cloud 50 may pop up when, for example, a cursor moves into user entry field 56 or other designated area or when the user device moves in a particular translating and/or rotating movement. Cloud 50 may disappear or fade away when, for example, the cursor moves outside of cloud 50 or field 56, a predetermined amount of user inaction time has passed, the user device moves in a particular translating and/or rotating movement, or a user action, such as clicking a close button or icon, has occurred.

In particular embodiments, cloud 50 may pop up when a cursor moves over (and perhaps stays on) an object, such as a word, link, or other object in a document, application, or webpage. In the embodiments, cloud 50 may accept a first input programmatically and display output terms 52 related to or derived from the object. An output term 52 may be selected to formulate a query to submit to another module, web page, form, API, application, or search engine.

In particular embodiments, cloud 50 is interactive, that is, a user may perform a user action to interact with cloud 50. Examples of user actions include clicking, dragging, or otherwise selecting a term; and entering, modifying, or removing a term in a field. Other examples of user actions include movement of the user device in a predetermined manner (translating and/or rotating the device) by the user, or selection of a part of the device (a keyboard or pad button or soft key) by the user. In particular embodiments, if the cursor is moved over a term, the term may change a graphical feature (for example, color), indicating that the term may be selected for a particular action (for example, removal).

In particular embodiments, cloud 50 is dynamic, that is, cloud 50 may update in response to a user action. For example, cloud 50 may update the terms, the graphical features (such as font size) of the terms, or other information.

In particular embodiments, a term may be added to or removed or excluded from input terms 54 of cloud 50 in response to a user action or other action (for example, programmatically passing a term from another application, module, or interface as input to cloud 50). For example, a user action may cause an input term to be updated. Updating the input term leads to a call to relatedness engines 40 to receive updated output terms. Cloud 50 is then updated with the updated output terms.

In particular embodiments, cloud 50 may be updated with new output terms 52 related to existing input terms 54. For example, the new output terms 52 may be identified by returning deeper terms in the present domain, where "deeper" may mean more specialized, less general, and/or less common. As another example, the new output terms 52 may be identified by determining relatedness according to a different domain (which, for example, may be a set of cloud-associated predefined domains).

An input term 54 may be removed from cloud 50 in any suitable manner. For example, a term may be removed by deleting the term from a field. As another example, a term may be removed by moving a cursor over the term, causing the term to change a graphical feature (for example, change to red or struck-through font) indicating that the term will be removed if selected, and then selecting the term. As another example, a term may be removed by moving the cursor over the term and double-clicking on the term.

An input term 54 may be removed from a search query in any suitable manner. For example, a term may be removed by adding the term to the query in the negative, e.g., in the form "and not [term]." As another example, a term may be removed by right clicking or single clicking and holding until there is a graphical feature change (such as a change in color or activation of a sound) indicating that the word is in a negative state, and then selecting the term.

Other suitable user actions may be performed to yield particular responses. In certain embodiments, clicking on different parts of a term may initiate addition or removal of the term. For example, clicking on the left side initiates addition, and clicking on the right side initiates negation (or vice-versa). In certain embodiments, clicking on terms in different regions of cloud 50 or in different clouds 50 may initiate addition or removal of the term. For example, clicking on a term in a cloud designated for adding terms initiates addition, and clicking on a term in a cloud designated for removing terms initiates removal.

In particular embodiments, for example, when GUI 24 is implemented in a mobile device, user actions that reduce the need for typing may be implemented. As an example, cloud 50 may appear or disappear or otherwise updated based movement, such as translation, rotation, and/or other gesture, of the user device. In certain cases, detecting a first type of movement makes cloud 50 appear, and detecting a second type of movement makes cloud 50 disappear. As another example, cloud 50 may be enabled in a webpage as determined by a "browser detect" targeted to mobile devices. As another example, keyboard or pad button or soft key that may bring up cloud 50 in the context of an application or browser.

Relatedness engine 40 determines relatedness among terms. Relatedness may be defined in any suitable manner. In particular embodiments, relatedness may be derived according to affinity. Any suitable definition of affinity may be used, for example:

1. Basic Affinity a. The basic affinity (A) between terms A and B may be defined as the ratio of the number of co-occurrence contexts that include both terms A and B over the number of co-occurrence contexts that include either of the terms A or B:

$A(A,B)=|AB|/|A \text{ or } B|$

Two terms may co-occur if they each appear at least once within the same co-occurrence context or "containers". Examples of co-occurrence contexts include a document and a paragraph. The following is a list of example containers and example corresponding term types:

| Container or co-occurrence context | Term |
   |---|---|
   | Webpage | Word or phrase |
   | Document | Word or phrase |
   | Recipe | Ingredient |
   | Web session | Webpage |
   | Communities a user is member of | Community or social group |
   | Movie collection of a user | Movie |
   | Music collection of a user | Song or artist | b. The basic affinity (A) between terms A and B may be defined as the ratio of the number of co-occurrence contexts that include both terms A and B over the maximum of either the number of co-occurrence contexts that include A or the number of co-occurrence contexts that include B:

$A(A,B)=|AB|/\max(|A|,|B|)$

2. Directional Affinity

The directional affinity (DAff) between terms A and B may be defined as the conditional probability of observing B, given that A was observed in a co-occurrence context:

$DAff(A,B)=|AB|/|A|$

That is, directional affinity may be the number of co-occurrence contexts that include both terms A and B, over the number of co-occurrence contexts that include term A. Generally, DAff(A,B) differs from DAff(B,A).

3. Differential Directional Affinity

The differential directional affinity (DiffDAff) between terms A and B may be defined as the directional affinity between terms A and B minus a factor that accounts for the common-ness of the term B in the corpus. The common-ness of the term B in the corpus may be a statistical value over the basic affinity or directional affinity values of the term B towards the other terms in the corpus. In particular embodiment, the common-ness of the term B in a corpus may be the average affinity (AA) of term B, which yields the following definition of differential directional affinity:

$DiffDAff(A,B)=DA(A,B)-AA(B)$

The average affinity (AA), or average directional affinity, of a term B may be defined as:

$AA(B)=\text{AVERAGE}\_x DAff(x,B)$

That is, average affinity may be the average of the directional affinities of a term B over the other terms in the co-occurrence contexts.

In particular embodiments, the affinities between terms may be used to construct a weighted directed graph of terms, in which the weight of the directed edge between terms denotes their absolute or relative proximity with respect to a domain. The graphs may be derived from collocation of terms in a single container or across one or more collections of multiple containers. For example, particular embodiments may use a collection of documents (containers) in a particular domain and the collocation of words or phrases (terms) in each document to create a weighted directed graph of terms, in which the weights denote the proximity between terms in the domain.

In particular embodiments, a domain may be vertical. Examples of vertical domains include domains associated with particular topics such as patents, medical information, financial information, telecommunications, recipes, etc. A domain may encompass one or more particular media types. Examples of media types include images, videos, movies, news, scientific articles, advertisements, etc. A domain may encompass one or more particular contexts. Examples of contexts include web sites, documents, collections, etc. A domain may relate to one or more particular users. Examples of such domains include one or more web sessions of the users, navigation histories of the users, one or more preferences of the users, data (such as e-mail) related to the users, one or more queries from the users to one or more search engines, and/or other domain.

Relatedness may be determined in any suitable manner. In particular embodiments, the relatedness may be determined according to any suitable calculation. An example of a calculation may be found in U.S. patent application Ser. No. 12/368,689, titled, "Determining Words Related to a Given Set of Words," filed 10 Feb. 2009, which is incorporated herein by reference. The calculation operates on a directed weighted graph of terms indicating the proximity of the terms. The calculation uses the input terms to the cloud as input. The output of the calculation is used as the output terms displayed in cloud 50. In particular embodiments, the relatedness may be determined by computing the relatedness of possible terms in a domain to at least a subset of the most recent input terms 54 of cloud 50, and returning the terms with the highest relatedness to input terms 54.

In particular embodiments, output terms 54 may be determined from user search queries. In the embodiments, queries with related terms may be determined. Queries that include input terms 54 may be ranked, for example, by their decreasing use frequency and then matched. A predetermined amount of the top ranked queries may be selected as queries with related terms.

In particular embodiments, term relatedness in reference to a specific domain or combination of domains does not limit the utility in a search, tagging, or recommendation process to that domain or combination of domains. For example, although relatedness may have been defined in reference to a domain of pharmaceutical patents, the terms may be used in a search process in a domain of news stories.

Logic 32 may include hardware, software, and/or other logic. Logic 32 may be encoded in one or more tangible media and may perform operations when executed by a computer. Certain logic 32, such as processor 36, may manage the operation of a component. Examples of processor 36 include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to system 10 without departing from the scope of the invention. The components of system 10 may be integrated or separated. Moreover, the operations of system 10 may be performed by more, fewer, or other components. Additionally, operations of system 10 may be performed using any suitable logic comprising software, hardware, and/or other logic. As used in this document, "each" refers to each member of a set or each member of a subset of a set.

Figure 3:
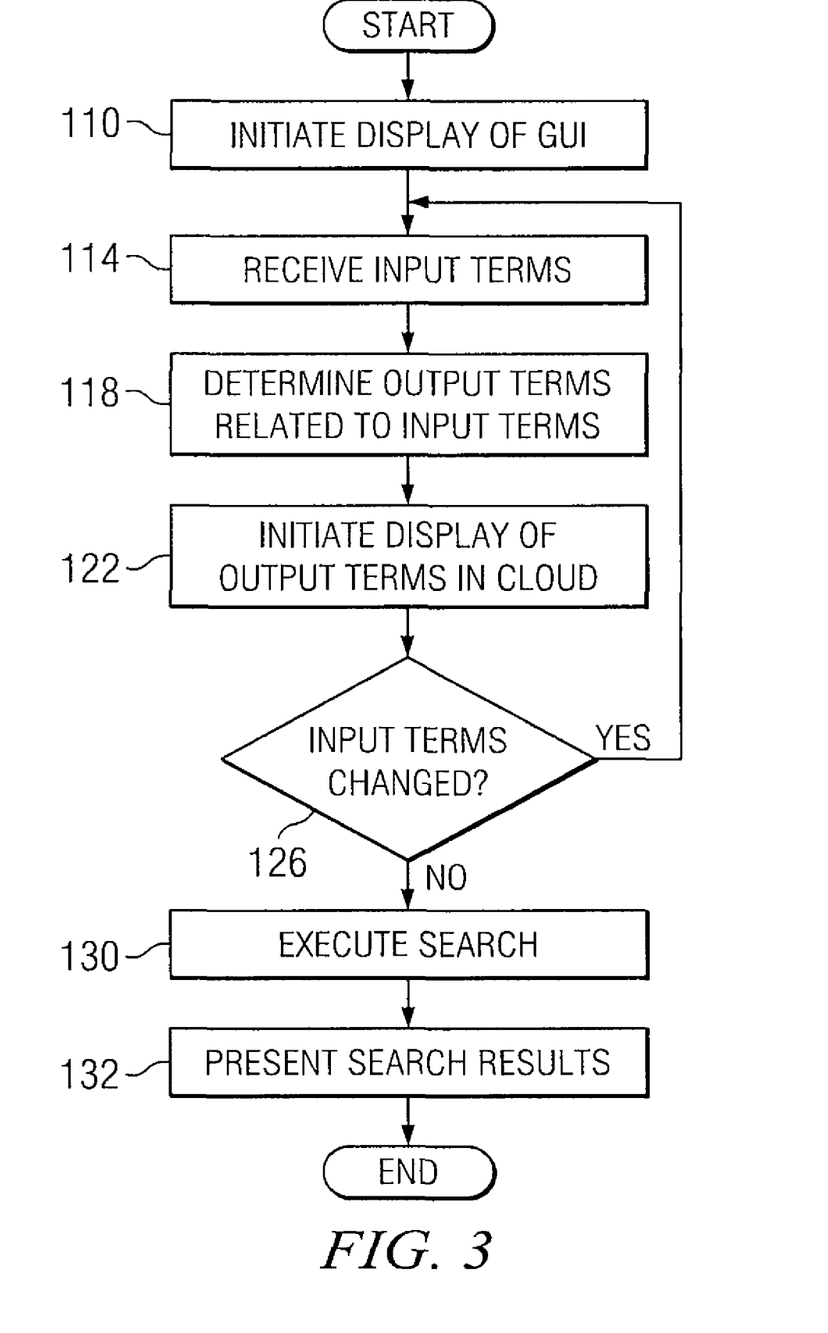
FIG. 3 illustrates an embodiment of a method that may be used to facilitate display of an interactive and dynamic cloud of terms related to one or more input terms.

FIG. 3 illustrates an embodiment of a method that may be used to facilitate display of an interactive and dynamic cloud 50 of terms related to one or more input terms 54. The embodiment is described with reference to FIGS. 4A through 4D.

Figure 4A:
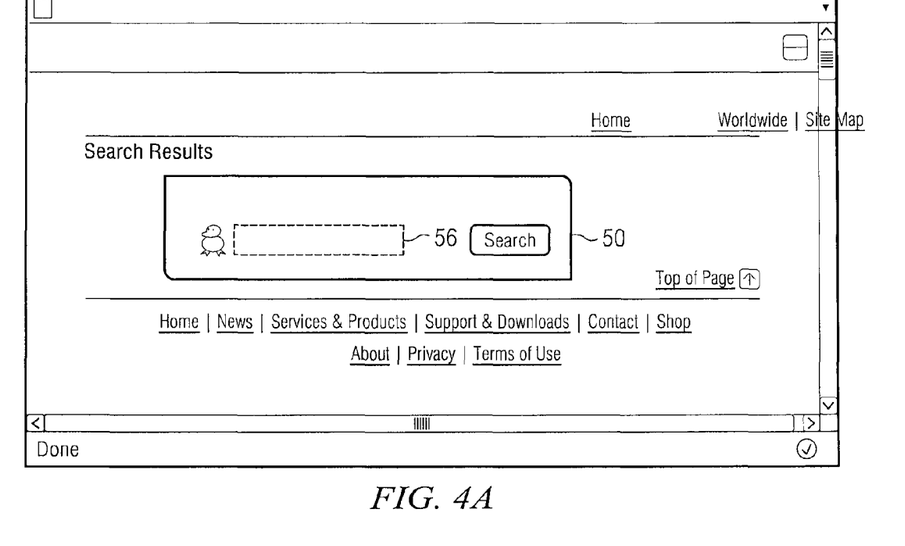
FIGS. 4A through 4D illustrate examples of a GUI that may be used with the method of FIG. 2.
Figure 4B:
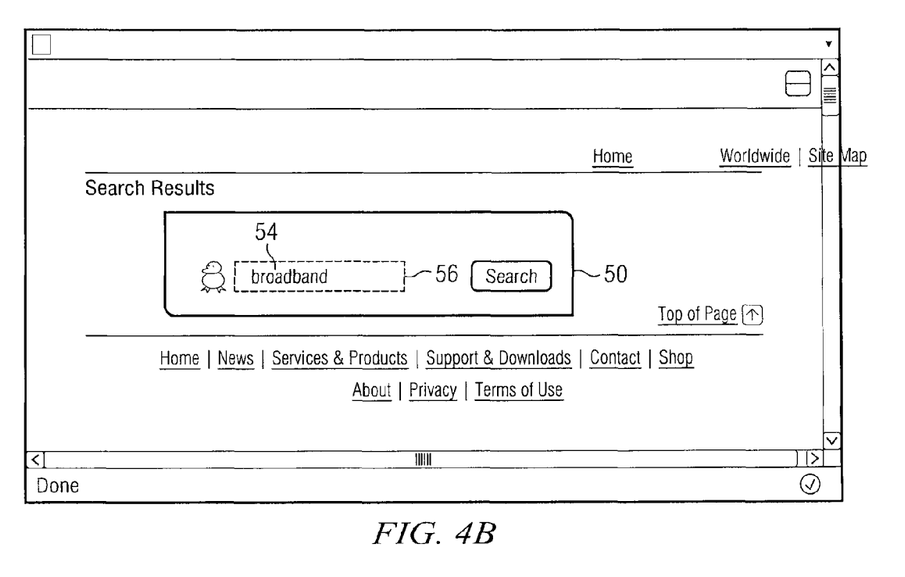

The method starts at step 11, where GUI facilitator 42 facilitates display of GUI 24 at client 20 (FIG. 4A). GUI 24 includes user entry field 56 and an empty cloud 50. Cloud 50 may appear when the cursor is moved over user entry field 56. One or more input terms 54 are received at step 114 (FIG. 4B). An input term 54 may be received as the user types each search term. In the example, "broadband" is entered. Output terms 52 related to the input terms 54 are determined at step 118.

Figure 4C:
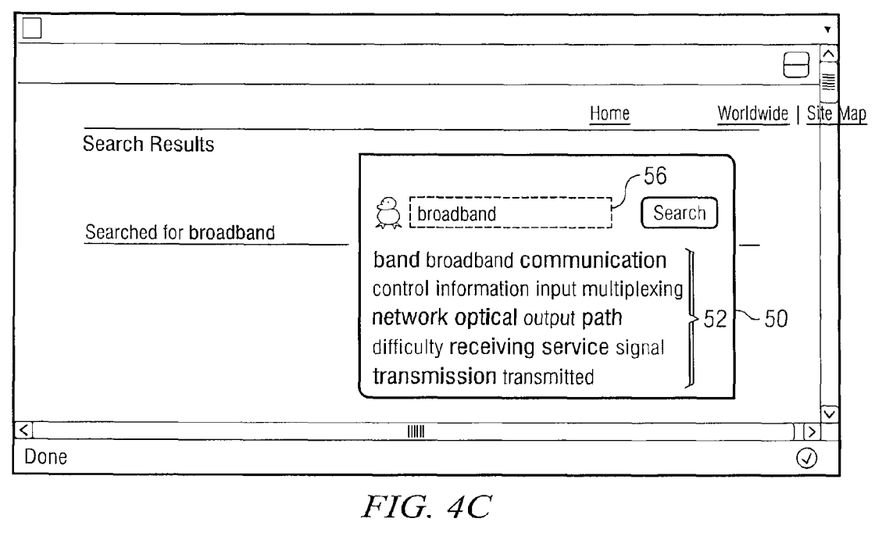

Display of output terms 52 of cloud 50 is facilitated at step 122 (FIG. 4C). Cloud 50 may display output terms 52 as suggestions for additional search terms. Output terms 52 may appear as the user is typing in the search terms. Output terms 52 may have font sizes that indicate the relatedness of output terms 52 to input terms 54.

Figure 4D:
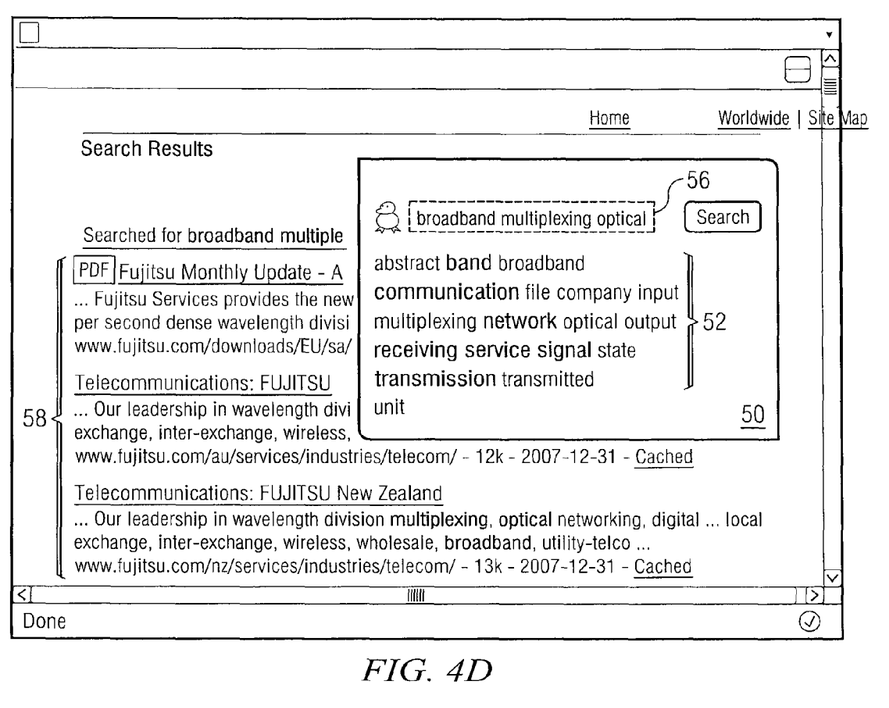

Input terms 54 may have changed at step 126 (FIG. 4D). For example, the user may click on an output term 52 to add the output term 52 to or remove the output term 52 from the search query. Every time input terms 54 change, output terms 52 of cloud 50 are updated. In the example, "multiplexing" and "optical" are added to "broadband," yielding different output terms 52. If input terms 54 are different, the method returns to step 114. If input terms 54 have not changed at step 126, the method proceeds to step 130.

The search query is executed at step 130. The query may be executed in response to an explicit request for execution sent by, for example, selecting a search button. In other embodiments, query may be executed automatically when a term is added to the query. Search results 58 are presented at step 132. Search results 58 may be presented on the same page and in the vicinity of cloud 50.

Modifications, additions, or omissions may be made to the methods herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A computer-implemented method comprising:
    facilitating display of a graphical user interface on a tangible display device;
    receiving one or more first input terms entered into a user entry window of the graphical user interface via a tangible user input device;
    determining, using a processor, one or more first output terms related to the first input terms;
    facilitating display on the tangible display device of a first graphical cloud of the graphical user interface, the first graphical cloud comprising the first output terms;
    determining, using the processor, that one or more of the first input terms have been modified to yield one or more second input terms, wherein the determination comprises determining that one or more of the first output terms is selected for negation, wherein negation of a first output term comprises adding the term in the negative to the one or more second input terms;
    determining, using the processor, one or more second output terms related to the second input terms; and
    facilitating display on the tangible display device of a second graphical cloud comprising the second output terms.

2. The method of claim 1, the determining that the first input terms have been modified further comprising:
    determining that a user action has occurred to modify the first input terms, the user action comprising one of the following user actions:
    clicking a term;
    dragging a term;
    entering a term;
    modifying a term; or
    deleting a term.

3. The method of claim 1, the determining that the first input terms have been modified further comprising:
    determining that the first input terms have been modified in at least one way selected from the following ways:
    a term has been added; and
    a term has been removed.

4. The method of claim 1, further comprising:
    determining that a cursor has moved over an output term; and
    changing a graphical feature of the term to indicate that the term can be selected for addition as an input term.

5. The method of claim 1, further comprising:
determining that a cursor has moved over an input term; and
changing a graphical feature of the term to indicate that the term can be selected for removal from the input terms.

6. The method of claim 1, further comprising:
determining that a cursor has moved over a term; and
changing a feature of the term to indicate that the term can be selected for negation.

7. The method of claim 1, the facilitating display of the first graphical cloud further comprising:
facilitating display of at least one output term having a graphical feature that indicates the degree of relatedness of the output term to the input terms.

8. The method of claim 1, the facilitating display of the first graphical cloud further comprising:
facilitating display of the output terms, each output term having a size that indicates the degree of relatedness of the each output term to the input terms, a larger size indicating a higher degree of relatedness.

9. The method of claim 1, the facilitating display of the first graphical cloud further comprising:
determining that a cursor has moved inside of a particular area of the graphical user interface; and
facilitating display of the cloud in response to the determination.

10. The method of claim 1, the facilitating display of the first graphical cloud further comprising:
determining that a cursor has moved outside of a particular area of the graphical user interface; and
removing the cloud from the graphical user interface in response to the determination.

11. The method of claim 1, further comprising utilizing the cloud for one of the following:
conducting a search query;
tagging an object; or
recommending an object referenced by a term.

12. The method of claim 1, the determining one or more first output terms related to the first input terms further comprising:
constructing a weighted directed graph of terms from one or more collections of terms, one or more edges of the weighted directed graph indicating relatedness between the terms; and
determining the output terms related to the input terms according to the weighted directed graph of terms.

13. The method of claim 1, the determining one or more first output terms related to the first input terms further comprising:
examining a plurality of search queries comprising the one or more first input terms;
selecting the more frequent one or more search queries;
designating one or more search terms of the selected queries as related; and
determining the output terms related to the input terms according to the related search terms.

14. The method of claim 1, the input terms or the output terms comprising at least one term of a type of the following types:
a term;
a title denoting a webpage;
a summary of a webpage;
a title of a recipe;
a username of a user;
a description of a webpage;
a title of a multimedia object;
a name of an artist;
a title of a document;
an author of a document; or
a title of a movie.

15. The method of claim 1, further comprising:
making the cloud appear in response to detecting a first type of movement; and
making the cloud disappear in response to detecting a second type of movement.

16. The method of claim 1, the determining one or more first output terms related to the first input terms further comprising:
determining one or more first output terms related to the first input terms with respect to one or more domains, a domain of the one or more domains selected from the following domains:
a patent domain;
a medical domain;
a financial domain;
a telecommunications domain;
a recipe domain;
an image domain;
a video domain;
a movie domain;
a news domain;
a scientific article domain;
an advertisement domain;
a web site domain;
a document domain;
a collection domain;
a user web session domain;
a user navigation history domain;
a user query domain;
a user preference domain; or
a user data domain.

17. The method of claim 1, the graphical user interface displayed by a device selected from the following devices:
a computer;
a television;
a mobile device; or
computerized goggles.

18. One or more tangible computer readable storage media storing logic when executed operable to:
facilitate display of a graphical user interface;
receive one or more first input terms entered into a user entry window of the graphical user interface;
determine one or more first output terms related to the first input terms;
facilitate display of a first graphical cloud of the graphical user interface, the first graphical cloud comprising the first output terms;
determine that one or more of the first input terms have been modified to yield one or more second input terms, wherein the determination comprises determining that one or more of the first output terms is selected for negation, wherein negation of a first output term comprises adding the term in the negative to the one or more second input terms;
determine one or more second output terms related to the second input terms; and
facilitate display of a second graphical cloud comprising the second output terms.

19. The media of claim 18, the logic further operable to determine that the first input terms have been modified by:
    determining that a user action has occurred to modify the first input terms, the user action comprising one of the following user actions:
        clicking a term;
        dragging a term;
        entering a term;
        modifying a term; or
        deleting a term.

20. The media of claim 18, the logic further operable to determine that the first input terms have been modified by:
    determining that the first input terms have been modified in at least one way selected from the following ways:
        a term has been added; and
        a term has been removed.

21. The media of claim 18, the logic further operable to:
    determine that a cursor has moved over an output term; and
    change a graphical feature of the term to indicate that the term can be selected for addition as an input term.

22. The media of claim 18, the logic further operable to:
    determine that a cursor has moved over an input term; and
    change a graphical feature of the term to indicate that the term can be selected for removal from the input terms.

23. The media of claim 18, the logic further operable to:
    determine that a cursor has moved over a term; and
    change a feature of the term to indicate that the term can be selected for negation.

24. The media of claim 18, the logic further operable to facilitate display of the first graphical cloud by:
    facilitating display of at least one output term having a graphical feature that indicates the degree of relatedness of the output term to the input terms.

25. The media of claim 18, the logic further operable to facilitate display of the first graphical cloud by:
    facilitating display of the output terms, each output term having a size that indicates the degree of relatedness of the each output term to the input terms, a larger size indicating a higher degree of relatedness.

26. The media of claim 18, the logic further operable to facilitate display of the first graphical cloud by:
    determining that a cursor has moved inside of a particular area of the graphical user interface; and
    facilitating display of the cloud in response to the determination.

27. The media of claim 18, the logic further operable to facilitate display of the first graphical cloud by:
    determining that a cursor has moved outside of a particular area of the graphical user interface; and
    removing the cloud from the graphical user interface in response to the determination.

28. The media of claim 18, the logic further operable to utilize the cloud for one of the following:
    conducting a search query;
    tagging an object; or
    recommending an object referenced by a term.

29. The media of claim 18, the logic further operable to determine one or more first output terms related to the first input terms by:
    constructing a weighted directed graph of terms from one or more collections of terms, one or more edges of the weighted directed graph indicating relatedness between the terms; and
    determining the output terms related to the input terms according to the weighted directed graph of terms.

30. The media of claim 18, the logic further operable to determine one or more first output terms related to the first input terms by:
    examining a plurality of search queries comprising the one or more first input terms;
    selecting the more frequent one or more search queries;
    designating the search terms of the selected queries as related; and
    determining the output terms related to the input terms according to the related search terms.

31. The media of claim 18, the input terms or the output terms comprising at least one term of a type of the following types:
    a term;
    a title denoting a webpage;
    a summary of a webpage;
    a title of a recipe;
    a username of a user;
    a description of a webpage;
    a title of a multimedia object;
    a name of an artist;
    a title of a document;
    an author of a document; or
    a title of a movie.

32. The media of claim 18, the logic further operable to:
    make the cloud appear in response to detecting a first type of movement; and
    make the cloud disappear in response to detecting a second type of movement.

33. The media of claim 18, the logic further operable to determine one or more first output terms related to the first input terms by:
    determining one or more first output terms related to the first input terms with respect to one or more domains, a domain of the one or more domains selected from the following domains:
    a patent domain;
    a medical domain;
    a financial domain;
    a telecommunications domain;
    a recipe domain;
    an image domain;
    a video domain;
    a movie domain;
    a news domain;
    a scientific article domain;
    an advertisement domain;
    a web site domain;
    a document domain;
    a collection domain;
    a user web session domain;
    a user navigation history domain;
    a user query domain;
    a user preference domain; or
    a user data domain.

34. The media of claim 18, the graphical user interface displayed by a device selected from the following devices:
    a computer;
    a television;
    a mobile device; or
    computerized goggles.

* * * * *